US011173919B2

United States Patent
De Weser et al.

(10) Patent No.: US 11,173,919 B2
(45) Date of Patent: Nov. 16, 2021

(54) CONTROL DEVICE, SYSTEM AND METHOD FOR DETERMINING A COMFORT LEVEL OF A DRIVER

(71) Applicants: TOYOTA MOTOR EUROPE, Brussels (BE); INSTITUT FRANÇAIS DES SCIENCES ET TECHNOLOGIES DES TRANSPORTS, DE L' AMÉNAGEMENT ET DES RÉSEAUX, Champs-sur-Marne (FR)

(72) Inventors: Marleen De Weser, Brussels (BE); Hugo Loeches De La Fuente, Marseilles (FR); Catherine Berthelon, Salon-de-Provence (FR); Christophe Jallais, Lyons (FR); Alexandra Fort, Chuzelles (FR); Virginie Etienne, Lyons (FR)

(73) Assignees: TOYOTA MOTOR EUROPE, Brussels (BE); INSTITUT FRANCAIS DES SCIENCES ET TECHNOLOGIES DES TRANSPORTS, DE L'AMÉNAGEMENT ET DES RÉSEAUX, Champs-sur-Marne (FR)

( * ) Notice: Subject to any disclaimer, the term of this patent is extended or adjusted under 35 U.S.C. 154(b) by 389 days.

(21) Appl. No.: 16/319,756

(22) PCT Filed: Jul. 20, 2016

(86) PCT No.: PCT/EP2016/067325
§ 371 (c)(1),
(2) Date: Jan. 22, 2019

(87) PCT Pub. No.: WO2018/014953
PCT Pub. Date: Jan. 25, 2018

(65) Prior Publication Data
US 2019/0225229 A1    Jul. 25, 2019

(51) Int. Cl.
*B60W 40/09* (2012.01)
*B60W 40/08* (2012.01)
*B60W 50/00* (2006.01)

(52) U.S. Cl.
CPC ............ *B60W 40/09* (2013.01); *B60W 40/08* (2013.01); *B60W 50/0098* (2013.01); *B60W 2040/0872* (2013.01)

(58) Field of Classification Search
None
See application file for complete search history.

(56) References Cited

U.S. PATENT DOCUMENTS 10,960,859 B2 *   3/2021   Takeuchi ............... G08G 1/166
2002/0091473 A1 *  7/2002   Gardner ............... G07C 5/0816
                                                    701/32.7

(Continued)

FOREIGN PATENT DOCUMENTS

DE         103 43 683 A1      4/2005
DE    10 2008 042342 A1      4/2010

(Continued)

OTHER PUBLICATIONS

Jul. 28, 2020 Office Action issued in Japanese Patent Application No. 2019-524507.

(Continued)

*Primary Examiner* — Kelly D Williams
(74) *Attorney, Agent, or Firm* — Oliff PLC (57) ABSTRACT

A control device for a vehicle for determining a comfort level of a driver, the control device being configured to: receive sensor output of a physiological sensor and a behavioral sensor, the physiological sensor measuring at least one physiological feature of the driver and the behavioral sensor measuring at least one behavioral feature of the driver, receive driving context information from a driving context (Continued)

detection unit, create a reference data set by recording the sensor output and the driving context information over a predetermined reference time period, determine a reference index for the comfort level of the driver based on the reference data set, and determine a comfort level index value of the driver, the index value being determined as a function of a current sensor output, current driving context information and the reference index. Further relates to a system and a method.

20 Claims, 6 Drawing Sheets

(56) References Cited

U.S. PATENT DOCUMENTS

| | | | | |
|---|---|---|---|---|
| 2002/0116156 A1* | 8/2002 | Remboski | ............... | G09B 9/052 |
| | | | | 702/188 |
| 2002/0120374 A1* | 8/2002 | Douros | ............... | G07C 5/085 |
| | | | | 701/34.4 |
| 2002/0151297 A1* | 10/2002 | Remboski | ............... | G07C 5/085 |
| | | | | 455/414.1 |
| 2013/0066688 A1* | 3/2013 | Pinkus | ............... | G06Q 50/26 |
| | | | | 705/7.41 |
| 2013/0070043 A1* | 3/2013 | Geva | ............... | B60K 28/066 |
| | | | | 348/14.02 |
| 2016/0001781 A1* | 1/2016 | Fung | ............... | B60K 28/02 |
| | | | | 701/36 |
| 2016/0107509 A1* | 4/2016 | Kirsch | ............... | B60H 1/00771 |
| | | | | 165/202 |
| 2019/0061772 A1* | 2/2019 | Prinz | ............... | A61B 5/18 |
| 2019/0100175 A1* | 4/2019 | Takeuchi | ............... | B60T 7/12 |

FOREIGN PATENT DOCUMENTS

| | | |
|---|---|---|
| DE | 10 2015 105494 A1 | 10/2015 |
| EP | 2 591 969 A1 | 5/2013 |
| JP | 2004-196102 A | 7/2004 |
| JP | 2016-91056 A | 5/2016 |
| WO | 2005/039415 A1 | 5/2005 |
| WO | 2008/127465 A1 | 10/2008 |

OTHER PUBLICATIONS

Wang, Jinjun et al., "Real-Time Driving Danger-Level Prediction", Engineering Applications of Artificial Intelligence; vol. 23, Issue 8, Dec. 2010, pp. 1247-1254.

Meng, Annette et al., "Cognitive Problems, Self-Rated Changes in Driving Skills, Driving-Related Discomfort and Self-Regulation of Driving in Old Drivers", Accident Analysis & Prevention, vol. 49, Nov. 2012, pp. 322-329.

Braunagel, C. et al., "Driver-Activity Recognition in the Context of Conditionally Autonomous Driving", in IEEE Conf. Intelligent Transportation Systems, 2015.

Apr. 12, 2017 Search Report issued in International Patent Application No. PCT/EP2016/067325.

Apr. 12, 2017 Written Opinion issued in International Patent Application No. PCT/EP2016/067325.

Jan. 7, 2020 Office Action issued in Japanese Patent Application No. 2019-524507.

* cited by examiner

CONTROL DEVICE, SYSTEM AND METHOD FOR DETERMINING A COMFORT LEVEL OF A DRIVER

FIELD OF THE DISCLOSURE

The present disclosure is related to a control device, system and method for a vehicle for determining a comfort level of a driver, in particular for measuring and quantifying online the experience of (dis)comfort during driving.

BACKGROUND OF THE DISCLOSURE

Currently, new technologies in the automotive industry increasingly integrate numerous and complex safety systems. These safety systems can be divided into two main categories: passive systems designed to minimize the severity of an accident (such as seat belts, airbags, etc.), and active systems designed to minimize the risk of occurrence of an accident. The advanced driver assistance systems (ADAS) fall into this latter category. ADAS are designed to improve driving safety by reducing the risk of human error. These embedded systems can interact with the driver in different ways, either by giving the driver additional information on the state of the environment (via a multi-modal communication interface: audio, visual, tactile, etc.), or by processing information about the driver's mental state such as stress, fatigue, vigilance or drowsiness in order to assist him and/or to prevent potential risks (cf. Jinjun Wang et al, 2010: "Real-time driving danger-level prediction", Engineering Applications of Artificial Intelligence; Volume 23, Issue 8, December 2010, Pages 1247-1254). These existing systems process individually stress, fatigue, vigilance or drowsiness by considering behavioural or physiological parameters separately.

However, it is desirable to not only measure one specific mental state of the driver (fatigue or drowsiness, etc.) but to measure the feeling or experience of discomfort in driving. Meng and Siren (2012) propose that discomfort in driving can be considered as a form of awareness of the driver of changes in his/her own driving ability (cf. Meng and Siren (2012): "Cognitive problems, self-rated changes in driving skills, driving-related discomfort and self-regulation of driving in old drivers" Accident Analysis & Prevention, Volume 49, November 2012, Pages 322-329). Thus, these authors define the feeling of discomfort as related to a feeling of anxiety as a consequence of being self-aware that one's driving ability in a specific driving situation (for example driving in heavy rain) may include a potential driving risk. This feeling of discomfort may increase in time and can lead to complete avoidance of specific driving situations. However, Meng and Siren only analyze subjective data using questionnaires without considering measuring the (objective) driver behavioural or physiological data. In addition, most of the research dealing with (dis)comfort in driving, addresses this notion mainly in terms of physical ergonomics of the driving cabin (posture, driver seat dimensions, etc.).

It is further known to measure the driver's mental state by electrophysiological and/or driver behavioral measures. For example, WO2008127465 (A1) discloses a system which predicts driving danger by capturing vehicle dynamic parameter, driver physiological data and driver behavior feature; applying a learning algorithm to the features; and predicting driving danger. However, the system only predicts the driving danger of the current driving situation, in order to warn a driver before an undesirable event as e.g. an accident happens.

SUMMARY OF THE DISCLOSURE

Currently, it remains desirable to provide a control device and method for determining a comfort level of a driver, in particular online during driving.

The invention applies a concept of (dis)comfort in driving which includes the multiple dimensions of (dis)comfort. These dimensions of (dis)comfort involve together body and mind and can be associated with mental wellness. Discomfort is thus defined as 'feeling uncomfortable, uneasy, tense when one's wellbeing is disturbed by a given situation', and can be measured/quantified when considering the driver's physiological and behavioral data.

Therefore, according to the embodiments of the present disclosure, a control device for a vehicle for determining a comfort level of a driver is provided. The control device being configured to:

receive sensor output of a physiological sensor and a behavioral sensor, the physiological sensor measuring at least one physiological feature of the driver and the behavioral sensor measuring at least one behavioral feature of the driver, receive driving context information from a driving context detection unit, create a reference data set by recording the sensor output and the driving context information over a predetermined reference time period, determine a reference index for the comfort level of the driver based on the reference data set, and determine a comfort level index value of the driver. Said comfort level index value is determined as a function of a current sensor output, current driving context information and the reference index.

By providing such a control device, it is possible to measure and quantify online the experience of (dis)comfort during driving. Accordingly, the (dis)comfort of the driver can be determined, in order to anticipate a negative long-term impact on the driver's behaviour.

Indeed, findings from experiences have shown that discomfort can be detected during driving situations and that the discomfort can persist after these driving situations. Discomfort can also be understood as a dynamical modification of the driver's mental state (i.e. when the mental state is affected) that is produced during a given driving situation and that could persist after it. It includes that the feeling of discomfort can evolve and grow into a stronger negative condition during the period following the driving situation. As such, the feeling of discomfort can become a 'residual general condition'. With the control device according to the disclosure it is possible to early detect discomfort in real-time, in order to avoid a stronger negative condition which may persist and even increase afterwards.

Moreover, by providing such a control device, the driving context can be taken into account to assess (dis)comfort in driving. Accordingly, it is possible to compare the current sensor output relating to the current specific driving situation with a specific reference index which is based on reference data relating to the same specific driving situation. In other words, the current measurements are only compared with those historical measurements which have been recorded in corresponding driving situations. Consequently, the (dis)comfort can be determined more precisely.

The driving context detection unit may use a combination of sensors, radar, GPS, and cameras, in order to generate the driving context information. The driving context detection unit may further be configured to interpret/recognize the current driving situation and generate the driving context information based on the result. In the context of determining the driving situation it is also referred to Braunagel et al (2015), which describe a novel approach to automated recognition of the driver's task based on eye- and head-tracking data (cf. C. Braunagel, W. Stolzmann, E. Kasneci, and W. Rosenstiel, "Driver-activity recognition in the context of conditionally autonomous driving," in IEEE Conf. Intelligent Transportation Systems, 2015).

The control device may further be configured to determine the comfort level index value of the driver based on the evolution (i.e. change) in time of the current sensor output.

In particular, the control device may be configured to determine a driving context event based on the driving context information. Such a driving context event may be for example a pedestrian crossing the road, a left turn of the vehicle or overtaking another vehicle. The determination of the comfort level index value may be based on sensor output of the time before, during and after the event (i.e. sensor output produced by the sensors before, during and after the event). The time before the event may comprise the period from the determination (i.e. prediction) of a potential driving event by the control device until the event (actually) occurs. The time after the driving event may be a predetermined period, e.g. 1 s to 5 s, which starts at the end of the event (i.e. when the control device determines that the event has ended).

Accordingly, the index value may be determined as a function of the driving context event, a current sensor output including sensor output of the time before, during and after the event, and the reference index.

By providing such a control device, behavioral and physiological information contained in the sensor output can be considered in their temporal dimension, in order to access the driver's mental state variations. For example, the mental state can be affected in a way during and after the occurrence of a sudden event changing into fear/surprise, or in a different way during and after situations with high-density traffic (i.e. high spatio-temporal pressure and social pressure) leading to stress/anxiety. By this, also the temporal pattern variations of the used behavioral and physiological information can be considered.

Hence, it has been found that in particular the sensor output of the time after the driving context event is highly relevant for determining the comfort level of the driver. In this regard the disclosure differs from known systems which merely consider the time before a potential event (like a potential accident), in order to trigger any warning function. In contrast thereto, the control device of the disclosure has a long-term function, which is not to avoid the current event but to assist the driver in the current event and especially in similar events in the future, in case a discomfort has been detected during (and in particular after) the current event.

The control device may define a fixed-length sliding window (SWL) during which the sensor output is recorded, the sliding widow having a length of in particular at least 10 s, 20 s or 30 s.

The control device may further define the degree of sliding windows over-lap (SWO) and determine the comfort level index value of the driver based the fixed-length sliding window.

The control device may sample the sensor output with the fixed-length sliding window at a predetermined sampling rate, in particular at a sample rate of at least 2,000 Hz.

The driving context information received by the control device may include traffic state information and/or driving task information.

Further, the control device may be configured to limit the sensor output to a set of selected features of the measured physiological and behavioral features based on the driving context information.

The control device may determine the comfort level index value based on the product of the set of selected features at each value within the sliding window, in particular based on the product of one behavioral feature and one physiological feature at each position of the sliding window, as:

$$CI_{(SWL,SWO)} = X \begin{bmatrix} x_1 \\ \vdots \\ x_n \end{bmatrix} \cdot Y \begin{bmatrix} y_1 \\ \vdots \\ y_n \end{bmatrix} \quad (1)$$

where n is the position of the sliding window, $x_n$ the value of the behavioural feature X at the n-th position of the sliding window and $y_n$ the value of the physiological feature Y at the n-th position of the sliding window.

The control device may define a threshold for the comfort level index value based on the reference index. The control device may further detect a discomfort state of the driver, when the comfort level index value exceeds the threshold. It may in particular trigger a driver assistance system based on the detected discomfort state and/or the current driving situation.

Such a threshold may be a specific threshold value of the reference index. It might be either a general and global threshold value adapted for all the drivers, or an individual threshold value adapted to an individual driver (or to a group of drivers, e.g. drivers with more than 70 years).

The control device may further determine the mean value (M) and the standard deviation (SD) of the reference index, in particular over the predetermined reference time period. The threshold (DT) for the comfort level index value may be determined by the equation (2):

$$DT = M + 4 \times SD \quad (2).$$

The predetermined reference time period may comprise a plurality of driving sessions, e.g. the operating time of the vehicle during several weeks. Accordingly, a long-term monitoring of the driver can be achieved what is suitable to anticipate any negative long-term impact of the experienced (dis)comfort. Hence, the control device may take into account at least the accumulated operating time of the vehicle within one month as a reference time period. In other words, the comfort level index value of the driver can be correlated against historical data (e.g. collected in the last 1 month) represented by the reference index.

Accordingly, the reference data set may be adjusted after (and desirably also during) each driving session. When there have not been any driving sessions of the vehicle yet (i.e. the vehicle is new), the reference data set may start from a predefined, i.e. 'universal', base level.

Alternatively, the reference data set may be adjusted during each driving session and be reset after each driving session.

The sensor output may include a physiological measurement output. The physiological measurement output may comprise a Skin conductance level (SCL) signal of the driver and/or an electrocardiographic (ECG) signal of the driver.

The control device may low-pass filter the Skin conductance level (SCL) signal, in particular at 1 Hz or less, more particularly by using a zero time-lag second-order Butterworth filter.

Additionally or alternatively the control device may normalize the Skin conductance level (SCL) signal by dividing it by a predetermined reference Skin conductance level (SCL).

It has been found out that the amplitude of normalized SCL (AS) is a very sensitive and robust marker of comfort/discomfort during the driving situation. In particular, the amplitude of normalized SCL (AS) can provide information on an increase in mental workload related to thermal physical discomfort.

The control device may determine the amplitude (AS) of the normalized SCL signal based on the difference between the maximal and minimal values of the normalized Skin conductance level (SCL) signal within the fixed-length sliding window.

The control device may determine the root mean square value (RMS) of the normalized SCL signal based on the following Equation (3):

$$RMS = \sqrt{\frac{1}{n}(x_1^2 + x_2^2 + \ldots + x_n^2)}, \quad (3)$$

where n is the number of normalized SCL values over the total duration of the fixed-length sliding window and x represents the corresponding normalized SCL values.

The heart rate (HR) of the driver may be determined based on the mean heart rate value of the ECG signal within the fixed-length sliding window. In particular, the heart rate variability (HRV) may be determined based on the beat-to-beat alterations in the heart rate.

The sensor output may include a behavioral measurement output. The behavioral measurement output may comprise the vehicle longitudinal speed, the vehicle lateral position and/or the steering wheel angle.

The control device may further determine the driver behavior based on the behavioral measurement output. The driver behavior comprising at least one of the standard deviation of the lateral position (SDLP), the standard deviation of speed (SDS), and the standard deviation of the wheel angle (SDWA).

The control device may determine the driver behavior as a function of the behavioral measurement output and the current driving context information.

Accordingly, it is possible to evaluate the driver behavior as a response to the current driving context information. For example, if the current driving situation is a left turn, it is expected that the driver steers to the left. Consequently, the driver behavior can be evaluated in this specific driving context.

The disclosure further relates to a system for a vehicle for determining a comfort level of a driver. The system comprises:
a control device as described above,
a physiological sensor for measuring at least one physiological feature of the driver,
a behavioral sensor for measuring at least one behavioral feature of the driver, and
the driving context detection unit.

The physiological sensor may comprise a conductance level (SCL) sensor, in particular with unpolarizable $A_g$ or $A_gC_l$ electrodes, more particularly with a surface of at least 30 mm$^2$. Additionally or alternatively the sensor may comprise an electrocardiographic (ECG) sensor, in particular with gold-plated active electrodes. Also a plurality of physiological sensors and/or a plurality of behavioral sensors may be used.

The disclosure further relates to a vehicle comprising a control device as described above or a system as described above.

The disclosure further relates to a method of determining a comfort level of a driver. The method comprises the steps of:
receiving sensor output of a physiological sensor and a behavioral sensor, the physiological sensor measuring at least one physiological feature of the driver and the behavioral sensor measuring at least one behavioral feature of the driver,
receiving driving context information from a driving context detection unit,
creating a reference data set by recording the sensor output and the driving context information over a predetermined reference time period,
determining a reference index for the comfort level of the driver based on the reference data set, and
determining a comfort level index value of the driver, the index value being determined as a function of a current sensor output, current driving context information and the reference index.

The method may comprise further method steps which correspond to the functions of the control device as described above.

Moreover, a reference Skin conductance level (SCL) may be determined before driving based on recording before starting driving the Skin conductance level (SCL) signal of the driver at the driver position for a predetermined time period, in particular for at least 5 min.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
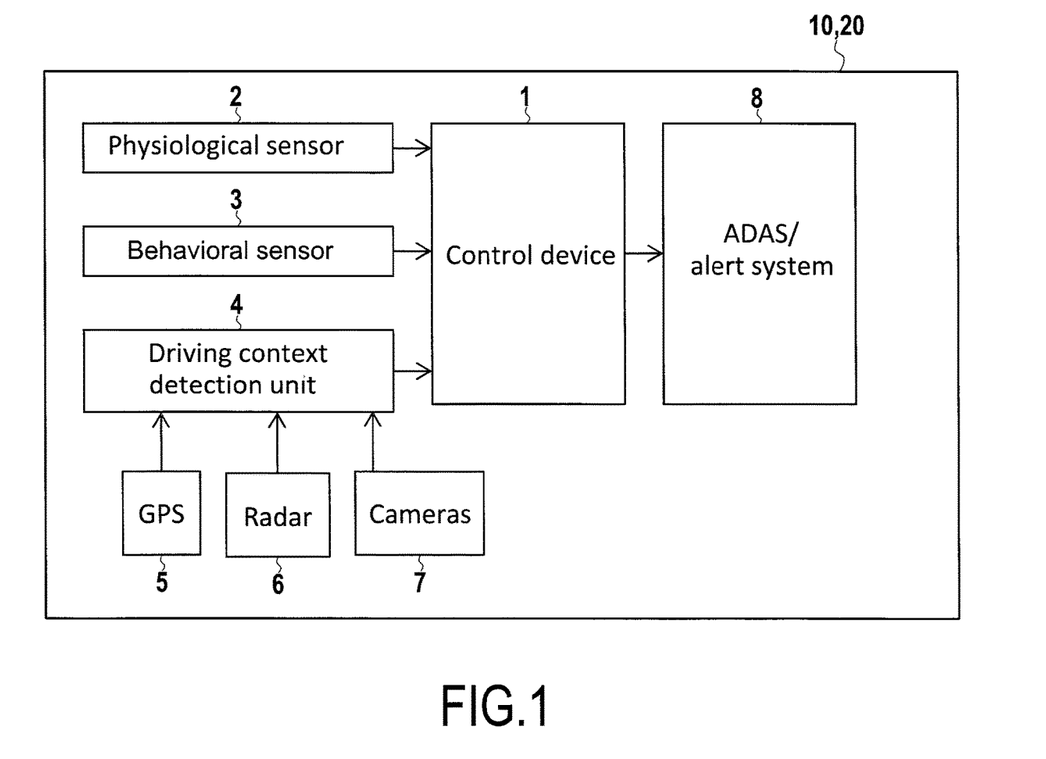
FIG. 1 shows a block diagram of a control device according to embodiments of the present disclosure.

FIG. 1 shows a block diagram of a control device 1 according to embodiments of the present disclosure. The control device is part of a system 20. The system 20 is comprised by a vehicle 10.

The control device 1 may be connected to or comprise a data storage for storing a reference data set. The control device 1 may comprise an electronic circuit, a processor (shared, dedicated, or group), a combinational logic circuit, a memory that executes one or more software programs, and/or other suitable components that provide the described functionality. The control device 1 may additionally carry out further functions in the vehicle 1. For example, the control device may also act as the general purpose ECU (electronic control unit) of the vehicle.

The control device 1 receives data output of one or several physiological sensors 2. The physiological sensors 2 measure at least one physiological feature of the driver. For example, the physiological sensors 2 measure the Skin conductance level (SCL) and/or the electrocardiographic signal (ECG). Both may be recorded at 2,000 Hz sampling rate. The SCL may be recorded with 30 mm² unpolarizable Ag/AgCl electrodes (Clark Electromedical Instruments). The SCL sensors are desirable located at least at the level of the second phalanx of the index and the third digit of the non-dominant hand of the driver. For ECG recording, gold-plated active electrodes may be used.

The control device 1 low-pass filters the Skin conductance level (SCL) signal, in particular at 1 Hz or less, more particularly by using a zero time-lag second-order Butterworth filter. The Skin conductance level (SCL) signal may be normalized by dividing it by a predetermined reference Skin conductance level (SCL). The control device 1 may also determine the amplitude (AS) of the normalized SCL signal based on the difference between the maximal and minimal values of the normalized Skin conductance level (SCL) signal within the fixed-length sliding window. To this aim, SCL should be first recorded at rest during 5 min before driving, while the driver sits at the driving wheel without any stimulation and then averaged to be considered the reference. The control device 1 may also determine the root mean square value (RMS) of the normalized SCL signal based on the following Equation (3):

$$\text{RMS} = \sqrt{\frac{1}{n}(x_1^2 + x_2^2 + \ldots + x_n^2)}, \quad (3)$$

where n is the number of normalized SCL values over the total duration of the fixed-length sliding window and x represents the corresponding normalized SCL values. The heart rate (HR) of the driver may be determined based on the mean heart rate value of the ECG signal within the fixed-length sliding window. In particular, the heart rate variability (HRV) may be determined based on the beat-to-beat alterations in the heart rate.

Furthermore, the control device 1 receives data output from one or several behavioral sensors 3. The behavioral sensors 3 measure at least one behavioral feature of the driver, in particular its driving behavior. For example, the behavioral sensors 3 measure the vehicle longitudinal speed, the vehicle lateral position on the road (e.g. supported by GPS) and/or the wheel angle. All data are desirably recorded at 60 Hz sampling rate. Based on this sensor output of the behavioral sensors 3, the control device determines the driver behavior comprising the standard deviation of the lateral position (SDLP), the standard deviation of speed (SDS), and/or the standard deviation of the wheel angle (SDWA).

Moreover the control device receives driving context information from a driving context detection unit 4. The driving context information describes the current driving situation. Such driving situations may include e.g. a situation in which the vehicle comprising the control device 1 overtakes another vehicle, a situation in the vehicle comprising the control device 1 is approaching a traffic light, a situation in which the vehicle comprising the control device 1 approaches a pedestrian or a pedestrian approaches the vehicle, a situation in the vehicle comprising the control device 1 is driven in the dark, a situation in the vehicle comprising the control device 1 makes a left-turn (in right-hand traffic), or other driving situations which may challenge the comfort level of the driver.

In order to determine the driving context information, the driving context detection unit 4 receives information from a plurality of measurement units which monitor the environment of the vehicle, e.g. a GPS 5, a radar 6 or one or several cameras 7. Also the output of the behavioral sensor may be received. For example, based on the information received from a GPS, cameras and an electronic map providing a scheduled driving route, the driving context detection unit 4 can determine a left turn of the vehicle. The driving context detection unit 4 may be an electronic control device, as e.g. a processor. It may also be provided by the general purpose ECU (electronic control unit) of the vehicle. It is further possible that the control device 1 comprises the driving context detection unit 4.

The control device 1 determines a driving context event based on the driving context information. In the examples mentioned above, such driving context events may be overtaking another vehicle, approaching a traffic light, approaching a pedestrian, driving in the dark, or making a left-turn (in right-hand traffic).

As described in the following, the control device 1 determines a comfort level index value of the driver, in particular it detect a discomfort state of the driver, when the comfort level index value exceeds a predetermined threshold DT. In such a case, it may trigger an advanced driver assistance system (ADAS) 8. Generally the ADAS may assist driving based on the received comfort level index value. For example the ADAS may increasingly assist driving, i.e. increasingly overtake driving control tasks, in case the comfort level index value decreases, i.e. the driver's discomfort increases.

Figure 2:
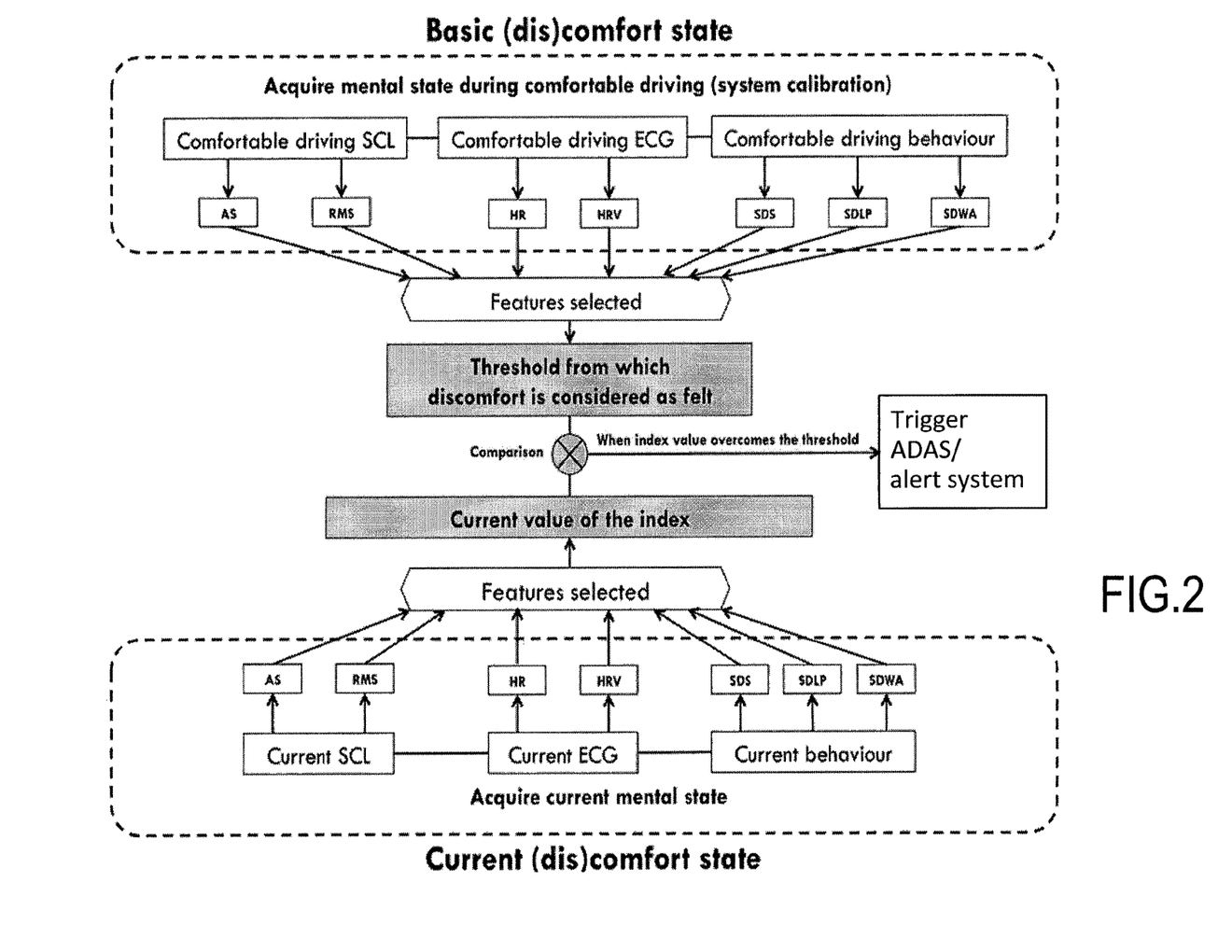
FIG. 2 shows a schematic diagram of the data flow and data processing in the control device according to embodiments of the present disclosure.

FIG. 2 shows a schematic diagram of the data flow and data processing in the control device according to embodiments of the present disclosure. The control device 1 determines a comfort level index value of the driver. Said value represents the current (dis)comfort state.

The comfort level index value is calculated based on the current sensor output, in particular based on a set of features including the amplitude (AS) of the normalized SCL, the root mean square value (RMS) of the normalized SCL signal, the heart rate (HR) of the driver may, the heart rate variability (HRV), the standard deviation of the lateral position (SDLP), the standard deviation of speed (SDS), and/or the standard deviation of the wheel angle (SDWA).

The comfort level index value is computed within a fixed-length sliding-window moving over the recorded data. In order to obtain the index, some parameters are specified:

The sliding-window fixed-length (SWL).
The sliding windows over-lap percentages (SWO).
The features of comfort/discomfort calculated within the sliding window.

The window length determines the number of data points per signal to be considered for a single window. The overlap factor determines the time offset between the first data points of two successive windows. While window length influences how much historical information is contained in a single window, the overlap factor influences how much historical information is shared among successive windows. Sliding windows of 10, 20, and 30 seconds can be used with over-lap percentages of 0%, 50%, and 99%.

Figure 3:
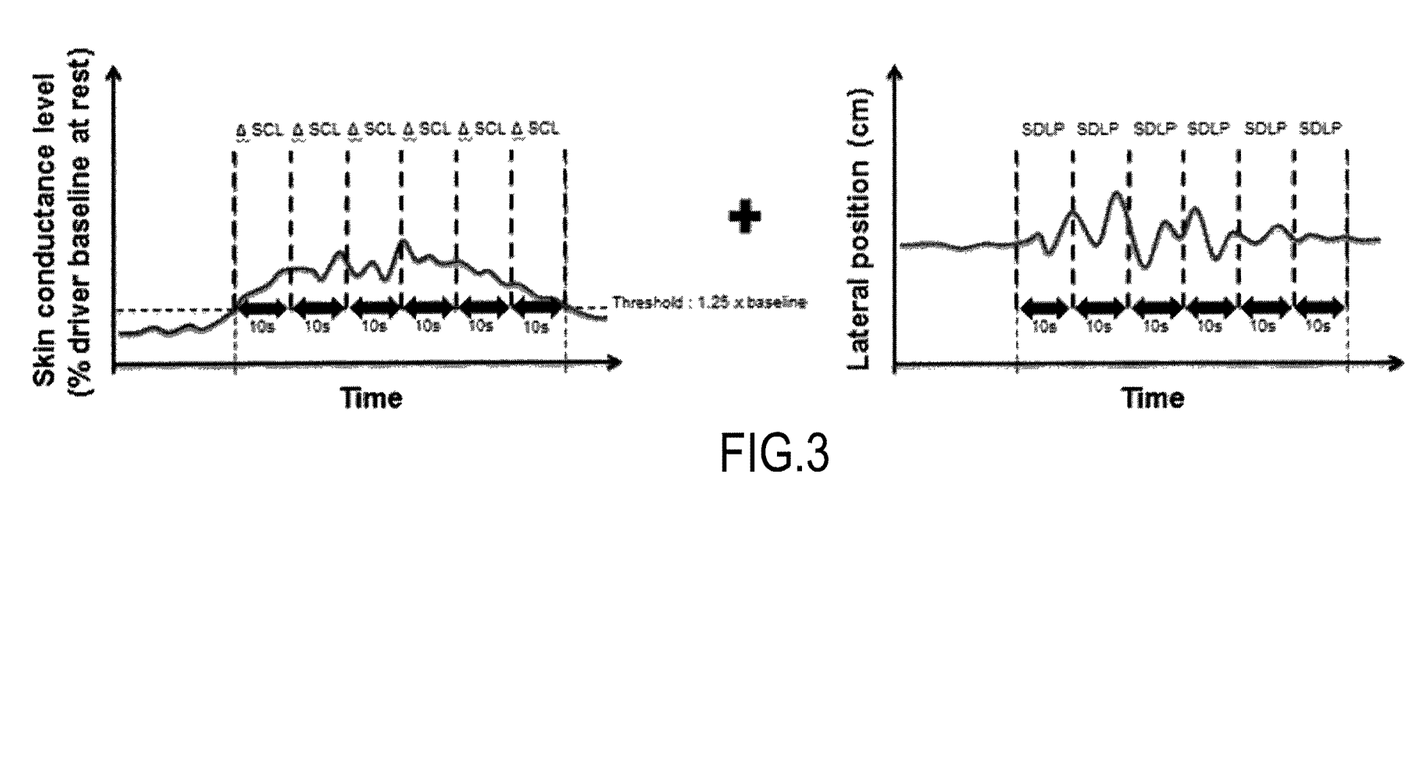
FIG. 3 shows two time diagrams used in a method to determine the reference index value for the comfort level according to embodiments of the present disclosure.
Figure 4A:
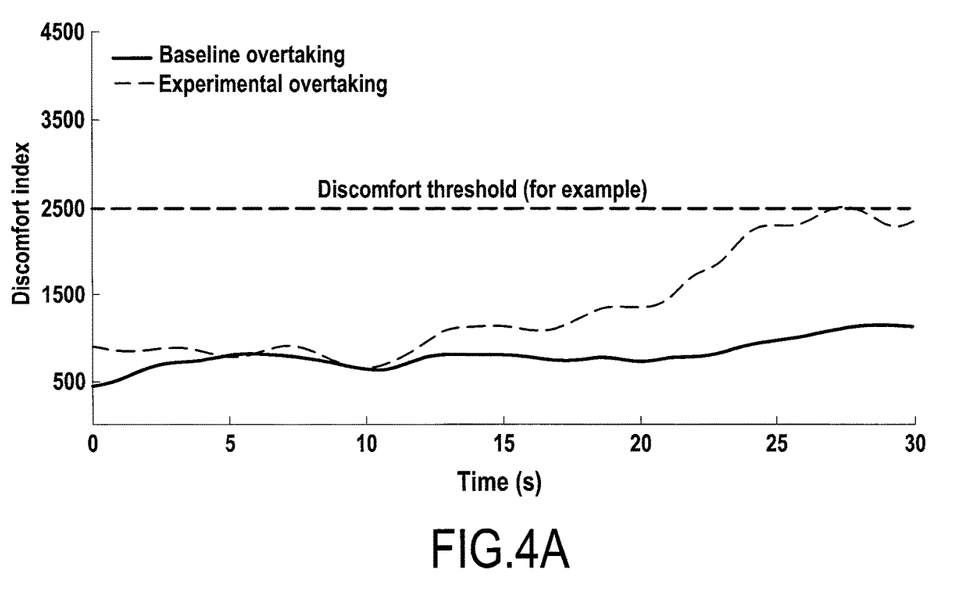
FIGS. 4a to 4d show time diagrams of the comfort level index in four different driving situations according to embodiments of the present disclosure.
Figure 4B:
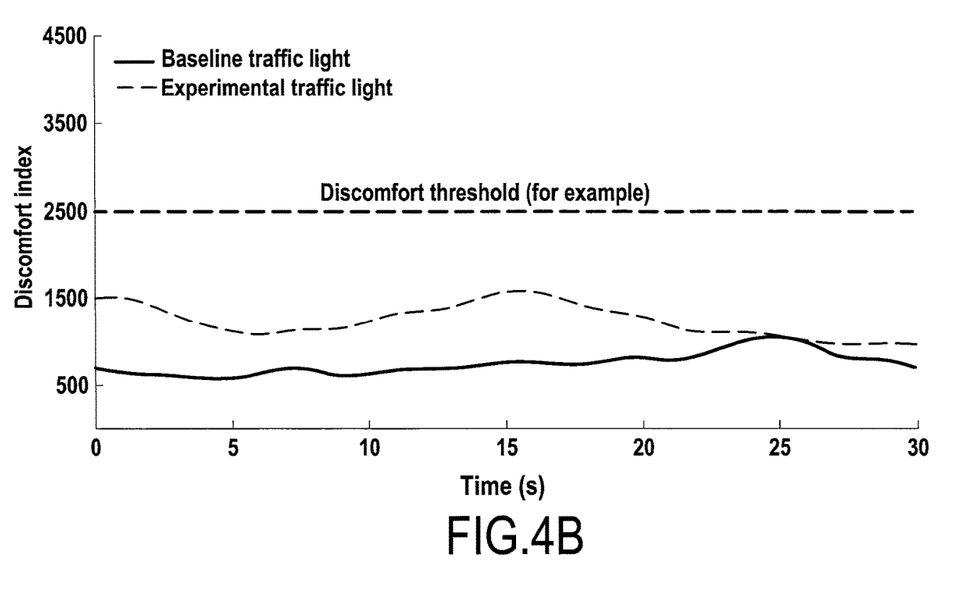
Figure 4C:
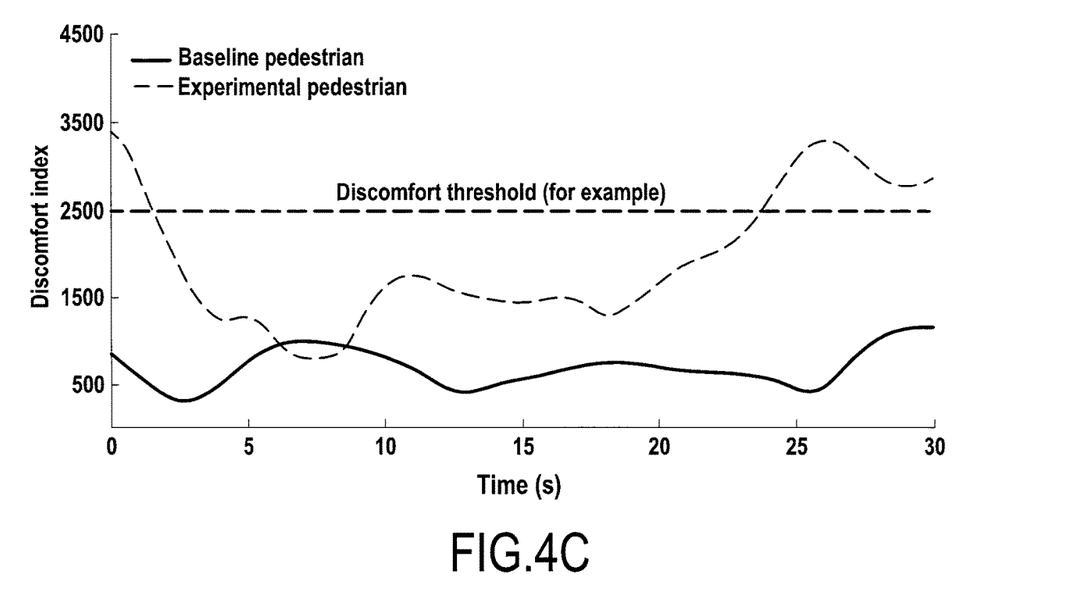
Figure 4D:
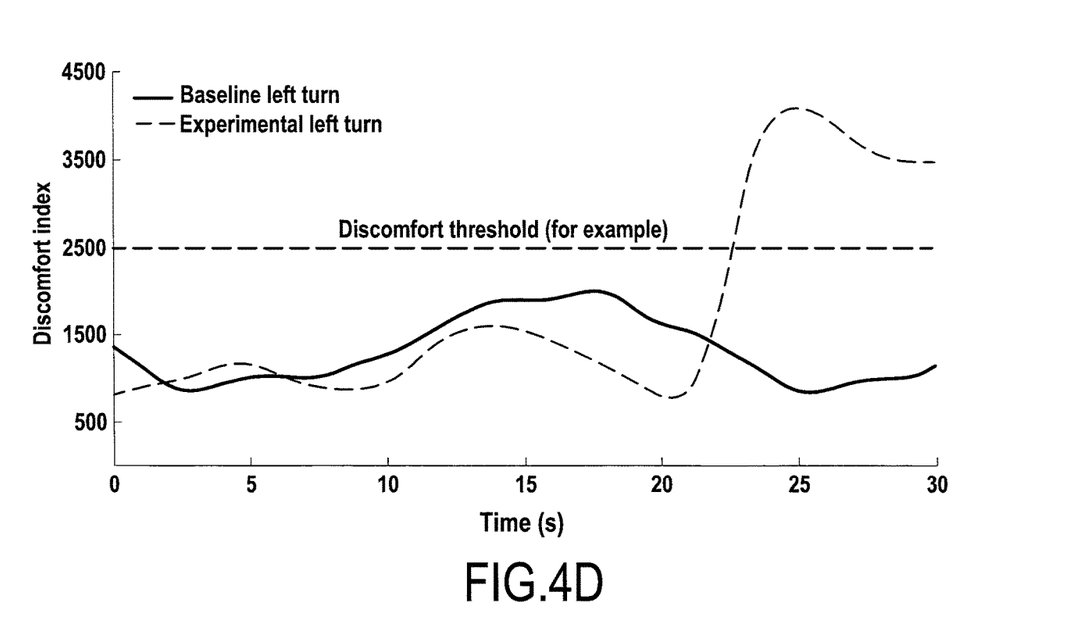

FIG. 3 shows two time diagrams used in a method to determine the reference index value for the comfort level according to embodiments of the present disclosure. As shown, once SWL and SWO parameters are defined, the index value can be directly obtained from the product (sum or multiplication) of the features at each position of the sliding window (each iteration). The selection of the features used for the index value computation desirably depends on the type of driving situation (e.g. sudden events or high-density traffic events). In this example the features ΔSCL (max SCL−min SCL) and SDLP (standard deviation of the lateral position) are used. It is noted that the thus calculated index value is still uncalibrated. In order to determine the correct index value, said uncalibrated index value has to be correlated against a reference data set (i.e. calibrated), as it is described in the following.

Again with reference to FIG. 2, the control device 1 further creates a reference data set by recording the sensor output and the driving context information over a predetermined reference time period, in particular by recording the formerly determined comfort level index value of the driver. Based on the reference data set the control device 1 determines a reference index for the comfort level of the driver. The reference index represents the basic (dis)comfort state.

The predetermined reference time period may comprise a plurality of driving sessions, e.g. the operating time of the vehicle during several weeks. Accordingly, a long-term monitoring of the driver can be achieved what is suitable to anticipate any negative long-term impact of the experienced (dis)comfort. Hence, the control device may take into account at least the accumulated operating time of the vehicle within one month as a reference time period. In other words, the comfort level index value of the driver can be correlated against historical data (e.g. collected in the last 1 month) represented by the reference index.

The reference index may be used to calculate a threshold for the comfort level index value. It is also possible that the threshold is calculated based on a predetermined selection of the set of features. To this aim, the mean value (M) and the standard deviation (SD) of the index time series will be computed over the predetermined reference time period. Then, discomfort threshold (DT) will be computed following Equation (2):

$$DT = M + 4 \times SD \qquad (2).$$

Accordingly, the index value is determined as a function of the current sensor output and the reference index, i.e. by correlating the current measurements against historical measurements. In this way it is possible to calibrate the currently determined (dis)comfort level. In particular the uncorrelated index value can be compared to the discomfort threshold (DT).

In addition, the index value is determined also as a function of the current driving context information. In this way it is possible to compare the currently determined (dis)comfort level only with those historical data which have been recorded in a corresponding driving event. Moreover it is possible to determine the length of the current driving event such that the determination of the comfort level index value can be based on sensor output of the time before, during and after the event.

FIGS. 4a to 4d show time diagrams of the comfort level index in four different driving situations according to embodiments of the present disclosure. The four different exemplary driving situations include overtaking a truck, taking a left turn, sudden appearance of a pedestrian crossing the road and passing a traffic light which is changing to amber. In each of the diagrams a baseline curve (low level of discomfort) and experimental curve (high level of discomfort induced by increased traffic density and time pressure) is shown. The baseline curve represents the reference data for the specific event and the experimental curve represents the current measurements. AS and SDLP features have been used for the calculation of the comfort level index. For 30 seconds following each driving situation, the curves illustrate the index as a function of time for the baseline (cf. continuous line) and the experimental (cf. dashed line) driving sessions, respectively. As it can be seen e.g. in FIG. 4d, a left turn in heavy traffic leads to a high level of discomfort of the test drivers which clearly exceeds the predefined threshold. It is furthermore interesting to note that the high level of discomfort occurs particularly in the end, i.e. during and after carrying out the left turn. When the control device recognizes such a high level of discomfort, it will desirably anticipate it by triggering the advanced driver assistance systems (ADAS) in future events of the same type (here the left turn). In this way the driver can be prevented from suffering of any negative long-term effects.

Figure 5:
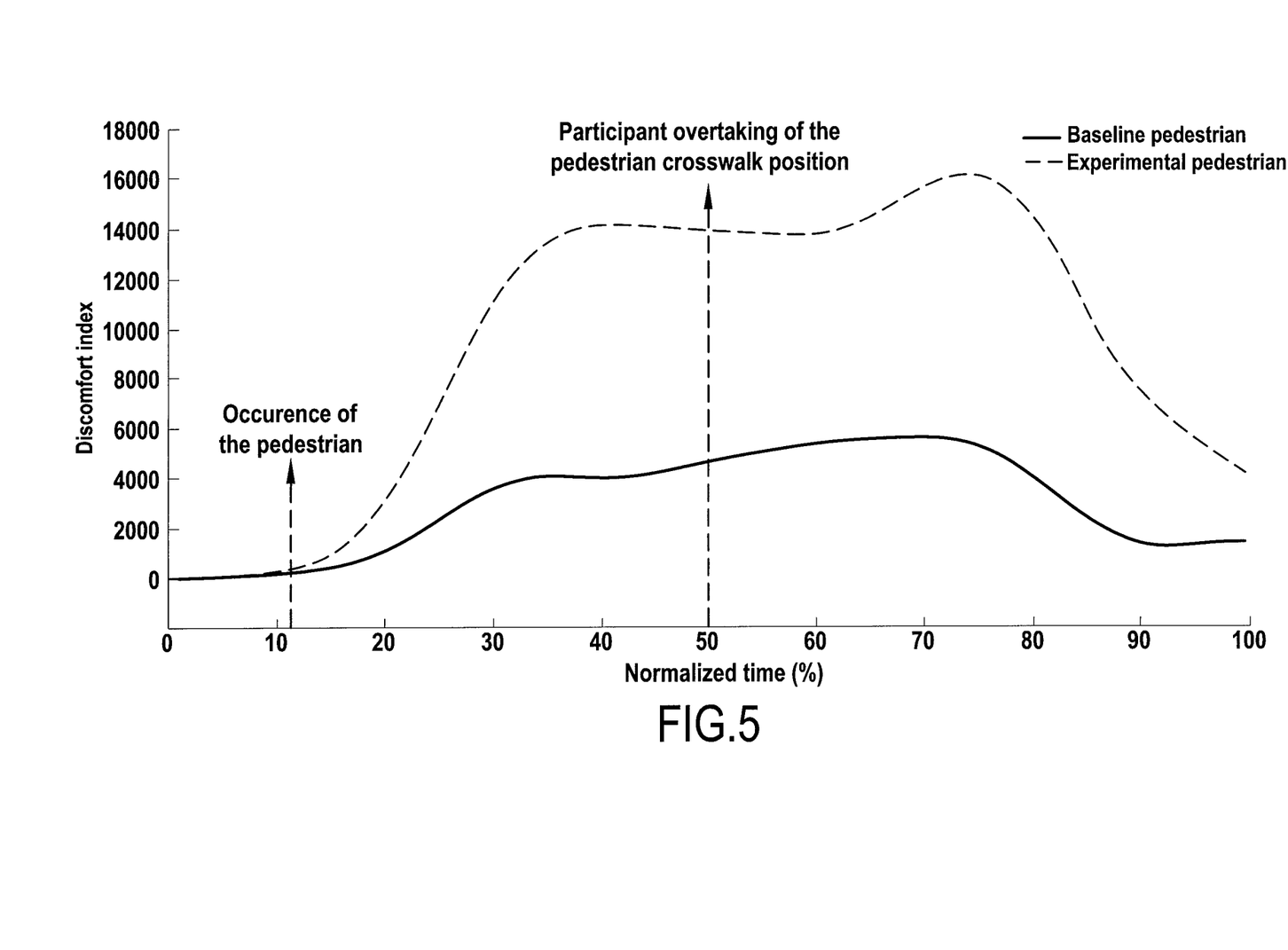
FIG. 5 shows a time diagram of the comfort level index in a driving situation with indication of the driving context event according to embodiments of the present disclosure.

FIG. 5 shows a time diagram of the comfort level index in a driving situation with indication of the driving context event according to embodiments of the present disclosure. The comfort level index has been calculated on a limited group of test persons for the situation where a pedestrian is passing. This pedestrian situation allows investigating how the test persons manage a situation of near accident for two different levels of time pressure (high level of discomfort induced by an increased time pressure for the experimental pedestrian situation). It has to be noted that the time has been normalized in both baseline and experimental curves in order to provide an easy comparison of the curves. This is the reason why in FIG. 5 the time occurrence of the pedestrian is superposed for the two signals.

In the example of FIG. 5 the control device 1 determines a driving context event, i.e. the vehicle passing a pedestrian on the crosswalk. Said event starts when the pedestrian occurs. This might be the time when the pedestrian becomes visible, i.e. is detected by a camera of the vehicle, and/or when the distance between approaching vehicle and pedestrian becomes less than a predetermined distance which is desirably calculated as a function of the vehicle speed. The event ends when the vehicle overtakes the pedestrian, i.e. passes the pedestrian, such that the vehicle departs again from the pedestrian. This end of the event may be e.g. detected by the cameras of the vehicle. As it can be seen in FIG. 5 the discomfort level of the driver still increases when the event already has ended. Therefore it is desirable to determine the comfort level index value based on sensor output of the time not only before and during but also after the event.

Summarized, FIGS. 4 *a-d* and 5 indicate that the calculation output can result in a scaling of (dis)comfort levels and that a threshold level for discomfort can be defined. This threshold level can indicate that the discomfort is causing difficulties for the driver to manage his driving task. At this point a driver assistance safety system could be triggered to support the driver, in particular in future events of the same type (by means of a warning, for example).

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A control device for a vehicle for determining a comfort level of a driver,
   the control device being configured to:
   receive sensor output of a physiological sensor and a behavioral sensor, the physiological sensor measuring at least one physiological feature of the driver and the behavioral sensor measuring at least one behavioral feature of the driver,
   receive driving context information from a driving context detection unit, create a reference data set by recording the sensor output and the driving context information over a predetermined reference time period,
   determine a reference index for the comfort level of the driver based on the reference data set, and
   determine a comfort level index value of the driver, the comfort level index value being determined as a function of a current sensor output, current driving context information and the reference index
   wherein the driving context information includes traffic state information and/or driving task information, and
   the control device is further configured to limit the sensor output to a set of selected features of the measured physiological and behavioral features based on the driving context information.

2. The control device according to claim 1, further configured to:
   determine a driving context event based on the driving context information, wherein
   the determination of the comfort level index value is based on sensor output of a time before, during and after the event.

3. The control device according to claim 1, further configured to:
   define a fixed-length sliding window (SWL) during which the sensor output is recorded, the fixed-length sliding widow having a length of at least 10s, 20s or 30s,
   define a degree of sliding windows over-lap (SWO), and determine the comfort level index value of the driver based the fixed-length sliding window.

4. The control device according to claim 3, further configured to:
   sample the sensor output with the fixed-length sliding window at a predetermined sampling rate.

5. The control device according to claim 3, further configured to:
   determine the comfort level index value based on a product of the set of selected features at each value within the fixed-length sliding window, as:

$$CI_{(SWL,SWO)} = X \begin{bmatrix} x_1 \\ \vdots \\ x_n \end{bmatrix} \cdot Y \begin{bmatrix} y_1 \\ \vdots \\ y_n \end{bmatrix}, \quad (1)$$

where n is the position of the sliding window, $x_n$ is the value of the behavioral feature X at the n-th position of the sliding window and $y_n$ is the value of the physiological feature Y at the n-th position of the sliding window.

6. The control device according to claim 3, further configured to determine:
   a heart rate (HR) of the driver based on a mean heart rate value of a ECG signal within the fixed-length sliding window.

7. The control device according to claim 1, further configured to:
   define a threshold (DT) for the comfort level index value based on the reference index,
   detect a discomfort state of the driver, when the comfort level index value exceeds the threshold (DT).

8. The control device according to claim 1, further configured to determine:
   a mean value (M) and a standard deviation (SD) of the reference index, and
   a threshold (DT) for the comfort level index value by the equation (2):

$$DT = M + 4 \times SD \quad (2).$$

9. The control device according to claim 1, wherein
   the sensor output includes a physiological measurement output, the physiological measurement output comprising a Skin conductance level (SCL) signal of the driver and/or a electrocardiographic (ECG) signal of the driver.

10. The control device according to claim 9, further configured to:
    low-pass filter the Skin conductance level (SCL) signal, and/or
    normalize the Skin conductance level (SCL) signal by dividing it by a predetermined reference Skin conductance level (SCL).

11. The control device according to claim 10, further configured to:
    determine an amplitude (AS) of the normalized SCL signal based on a difference between maximal and minimal values of the normalized SCL signal within a fixed-length sliding window.

12. The control device according to claim 11, further configured to:
    determine a root mean square value (RMS) of the normalized SCL signal based on the following Equation (3):

$$\mathrm{RMS} = \sqrt{\frac{1}{n}(x_1^2 + x_2^2 + \ldots + x_n^2)}, \quad (3)$$

where n is the number of normalized SCL values over a total duration of the fixed-length sliding window and x represents corresponding normalized SCL values.

13. The control device according to claim 1, wherein the sensor output includes a behavioral measurement output, the behavioral measurement output comprising a vehicle longitudinal speed, a vehicle lateral position and/or a steering wheel angle.

14. The control device according to claim 13, further configured to determine driver behavior based on the behavioral measurement output, the driver behavior comprising:
a standard deviation of the vehicle lateral position (SDLP),
a standard deviation of the vehicle longitudinal speed (SDS), and/or
a standard deviation of the steering wheel angle (SDWA).

15. The control device according to claim 13, further configured to determine the driver behavior as a function of the behavioral measurement output and the current driving context information.

16. A system for a vehicle for determining a comfort level of a driver,
the system comprising:
the control device according to claim 1,
the physiological sensor for measuring the at least one physiological feature of the driver,
the behavioral sensor for measuring the at least one behavioral feature of the driver, and
the driving context detection unit.

17. The system of claim 16, the physiological sensor comprising:
a conductance level (SCL) sensor, and/or
an electrocardiographic (ECG) sensor.

18. A vehicle comprising:
the control device according to claim 1 or
a system comprising:
the control device,
the physiological sensor for measuring the at least one physiological feature of the driver,
the behavioral sensor for measuring the at least one behavioral feature of the driver, and
the driving context detection unit.

19. A method of determining a comfort level of a driver, the method comprising the steps of:
receiving sensor output of a physiological sensor and a behavioral sensor, the physiological sensor measuring at least one physiological feature of the driver and the behavioral sensor measuring at least one behavioral feature of the driver,
receiving driving context information from a driving context detection unit,
creating a reference data set by recording the sensor output and the driving context information over a predetermined reference time period,
determining a reference index for the comfort level of the driver based on the reference data set, and
determining a comfort level index value of the driver, the comfort level index value being determined as a function of a current sensor output, current driving context information and the reference index and
wherein the driving context information includes traffic state information and/or driving task information, and the sensor output is limited to a set of selected features of the measured physiological and behavioral features based on the driving context information.

20. The method according to claim 19, wherein
a reference Skin conductance level (SCL) is determined before driving based on recording, before starting driving, the Skin conductance level (SCL) signal of the driver at a driver position for a predetermined time period.

* * * * *